Nov. 3, 1953   P. A. DRISCOLL   2,657,773
AUTOMATIC BRAKE ADJUSTMENT
Filed March 16, 1950   2 Sheets-Sheet 1

INVENTOR.
PAUL A. DRISCOLL
BY
ATTORNEY

Nov. 3, 1953     P. A. DRISCOLL     2,657,773
AUTOMATIC BRAKE ADJUSTMENT

Filed March 16, 1950     2 Sheets-Sheet 2

INVENTOR.
PAUL A. DRISCOLL
BY
ATTORNEY

Patented Nov. 3, 1953

2,657,773

UNITED STATES PATENT OFFICE 2,657,773

AUTOMATIC BRAKE ADJUSTMENT

Paul A. Driscoll, South Bend, Ind., assignor to Bendix Aviation Corporation, South Bend, Ind., a corporation of Delaware Application March 16, 1950, Serial No. 149,942

14 Claims. (Cl. 188—152)

1

The present invention relates to a hydraulic device for automatically maintaining a predetermined running clearance between the rotatable and nonrotatable friction elements of a hydraulically actuated brake and more particularly to an automatic adjuster of the hydraulic type for maintaining the desired released spacing between friction disk elements of an aircraft disk brake.

The primary object of this invention is to provide an automatic brake adjusting device which may be interposed in the hydraulic brake system between the hydraulic actuator of the brake and the fluid pressure generating mechanism and which will serve to maintain a certain predetermined pressure in the hydraulic actuator at all times during brake release and to determine the brake disk clearance irrespective of brake wear.

Another object of this invention is to provide a hydraulic automatic brake adjuster which will compensate for sudden increases in fluid pressure at the hydraulic actuator of a magnitude capable of uncontrollably applying the brakes. In aircraft brakes, it is well known that some brake applications generate great amounts of heat energy which is absorbed in part by the brake elements. This heat travels to the hydraulic actuating structure, and if it is sufficiently great, will cause the brake fluid to vaporize, resulting in exorbitant pressures acting to apply the brakes. This invention prevents the deleterious effects of vaporization of the brake fluid by providing a relief valve which is biased to open at a predetermined pressure thus bleeding excessive pressure from the hydraulic actuator. This particular feature further serves to maintain a predetermined residual pressure acting on the hydraulic actuator which tends to prevent leakage of fluid from the actuator. In most designs, rubber or the like sealing rings are used on the heads of the pistons of the actuators to prevent the leakage of fluid therearound; however, after a period of usage, the sealing rings tend to lose their resiliency and fall away from the walls of the piston chambers. By maintaining a residual pressure bearing on these sealing rings, a forceful sealing contact is made with the chamber walls thereby preventing piston leakage.

Another object of the present invention is to provide an automatic adjusting device in combination with a brake whereby only one such device is needed to maintain the desired brake adjustment. This object constitutes a material advantage over presently known adjusters which must be used in quantity to produce the desired result.

2

Other objects will become apparent as the description proceeds.

Figure 1:
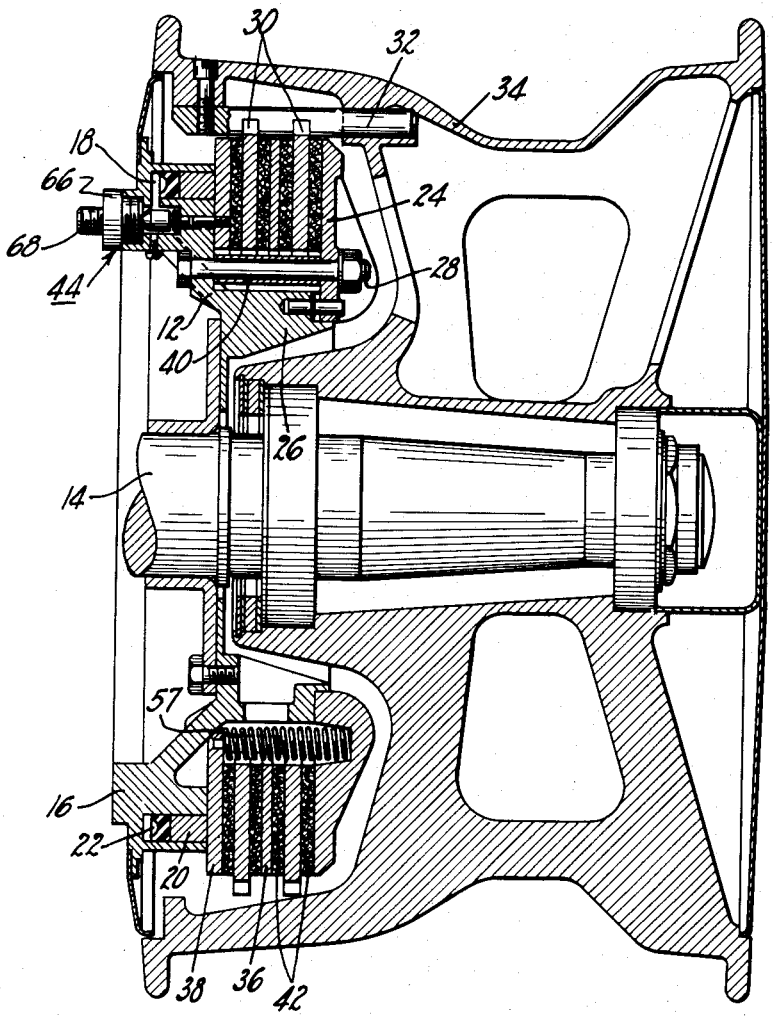
Figure 1 is an axial section of an aircraft wheel and disk brake assembly utilizing an embodiment of this invention.
Figure 2:
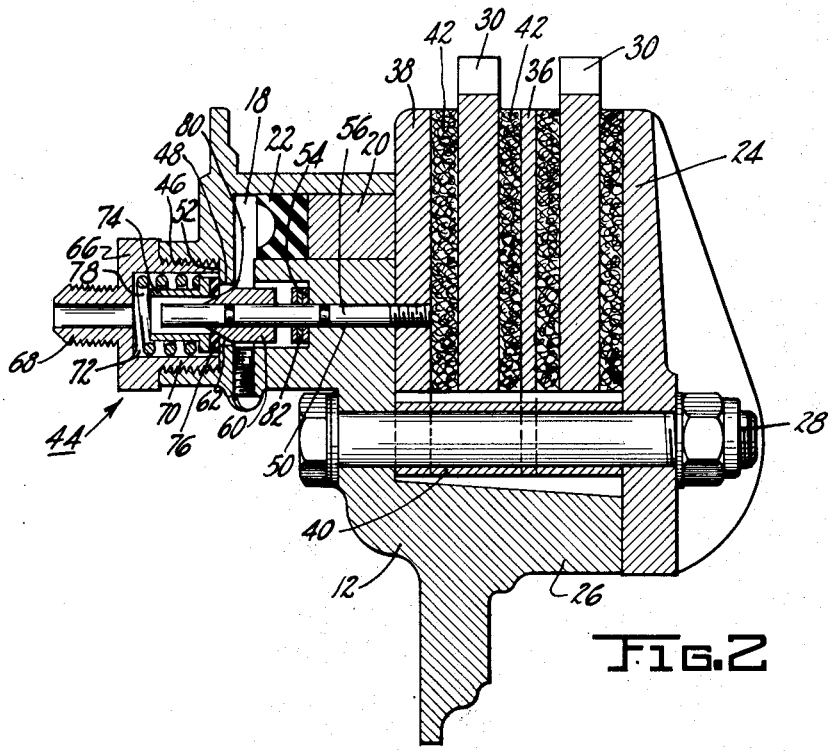
Figure 2 is an enlarged fragmental section of Figure 1 showing the various parts of the adjuster.
Figure 3:
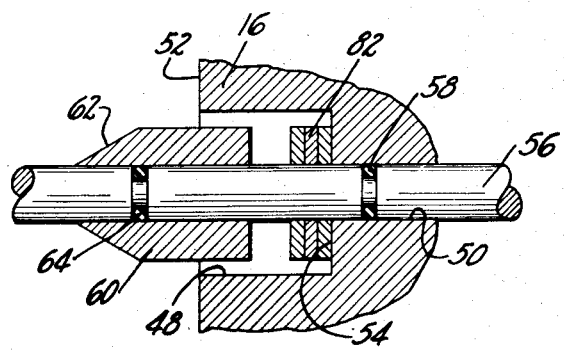
Figure 3 is an enlarged section of Figure 2 showing the O-ring seals.

Referring to the construction illustrated in Figures 1 to 3 inclusive, the disk brake structure with which the automatic adjustment is associated includes a hydraulic actuator supporting member or carrier plate 12, which is a stationary member secured to the nonrotating axle 14. The member 12 has an outwardly extending flange 16, within which is provided an annular chamber 18 housing an annular piston 20 and seal 22, the piston and seal being reciprocable in the chamber 18 under the opposing influences of fluid pressure admitted to chamber 18 and the brake return springs. Located at the opposite side of the brake assembly is backing plate or disk 24 which is secured in position against sleeve 26 of carrier 12 by means of a plurality of circumferentially spaced axially extending bolts 28.

One or more rotatable friction disks 30 are arranged in the brake assembly between support member or flange 16 and backing plate 24, these rotors 30 being driven by a plurality of circumferentially spaced, axially extending driving keys 32 which are carried by the wheel 34. Because, in the present illustration, two rotor disks are provided, a nonrotatable or stator disk 36 is located between the rotors and a pressure plate 38 is located between piston 20 and the other brake disks. The two rotor disks 30 are axially movable along the keys 32, and the stator disk 36 and pressure plate 38 are axially movable along the anchor sleeves 40, which are received on bolts 28. Suitable friction lining material 42 may be provided on each surface of stator disk 36 and on the inner surfaces of pressure plate 38 and backing plate 24, the lining being secured to the respective disks by suitable fastening means, such as the usual rivets.

It will, of course, be appreciated that development of frictional resistance which impedes the rotation of wheel 34 is accomplished by forcing fluid under pressure into chamber 18, thereby moving piston 20 toward the right to compress the brake disks between pressure plate 38 and backing plate 24. Suitable return springs are provided to move pressure plate 38 and piston 20 to released position after reduction of the fluid pressure in chamber 18.

As the brake lining wears, the distance through which piston 20 and pressure plate 38 must be moved to actuate the brake will gradually increase, unless suitable means are provided to adjust the brake. It is the purpose of this invention to accomplish this desirable adjustment automatically.

The adjuster of this invention, generally indicated by the reference numeral 44, is characterized as being of the hydraulic type, being responsive to fluid pressures and acting to trap fluid in chamber 18 ahead of piston 20. This adjuster, as illustrated, is wholly contained within an opening having three different diameter portions in progressive stepped relation. The largest diameter opening is indicated by reference numeral 46, the intermediate diameter opening by numeral 48, and the smallest diameter opening by numeral 50. A shoulder 52 is formed at the confluence of the two larger diameter portions 46 and 48, respectively, and another shoulder 54 is formed at the confluence of the intermediate diameter portion 48 and the smallest opening 50. As viewed in Figure 2, these three different diameter portions extend completely through the flange 16.

Slidably received in the opening 50 is a pin 56 which is threaded into pressure plate 38 and provided with an O-sealing ring 58 which provides a fluid seal between the pin 56 and the wall of the opening 50. An annular valve 60 formed with a conically shaped nose 62 is slidably received on pin 56 for longitudinal movement within the intermediate opening 48, pin 56 also being provided with an O-sealing ring 64 which provides a fluid seal between pin 56 and the central opening of valve 60. A conduit fitting 66 is provided with an externally threaded nipple 68 adapted to be connected to a suitable conduit, and an oppositely extending larger diameter portion 70 which is threadedly received within the opening 46. This fitting 66 is counter-bored to provide a valve chamber 72 which reciprocably receives a flanged tubular member 74 which carries on its flanged end an annular rubber or the like valve member 76 which is adapted to abut against, in sealing relation, the shoulder 52 hereinafter referred to as a valve seat. A compression spring 78 surrounds sleeve 74 and bears against the end of chamber 72 and the flange thereby urging the valve member 76 into constant engagement with valve seat 52.

The chamber 18 ahead of piston 20 communicates with the intermediate chamber 48 by means of an opening 80. Depending upon the desired design, a plurality of annular shims 82 surrounding pin 56 and abutting against shoulder 54 may be provided. The distance between the shims and the right-hand end of the valve 60 determines the running clearance between the rotatable and nonrotatable brake disks 30 and 36.

In order to sever fluid communication between the chamber 72 and opening 48, assuming that valve member 76 is properly seated, the nose 62 of valve 60 is caused to enter and engage the inner edge of the opening of the valve member 76. Thus, if the fluid pressure in chamber 18 exceeds that in chamber 72, valve 60 will be forced to the left into tighter sealing engagement with valve member 76. Should this pressure in chamber 18 exceed a predetermined amount, the valve member 76 will be unseated against the influence of spring 78 to allow the reduction of pressure in chamber 18 to the point where it is balanced by spring 78 at which time the valve 76 will close.

In operation, pressure fluid passes through the inlet fitting 68, opening valve 60 which is slidable on rod 56 against the slight frictional resistance produced by the O-ring seal 64. As pressure is further applied, the piston 20 forces pressure plate 38 to the right which pulls pin 56 along with it, valve 60 moving along with O-ring 64 until it abuts against the shims 82. Assuming that there is need for brake adjustment, the pin 56 and its O-ring 64 will move to the right through valve 60 until the brake disks come into frictional contact.

Upon release of the brake pressure, piston 20 and pressure plate 38 move to the left under the influence of return springs 57 causing pin 56 and O-ring 64 to also move to the left carrying with them the valve 60. When the rod 56 and the valve 60 have moved an amount corresponding to the proper running clearance, valve 60 seals against the inner perimeter of valve 76; whereupon, the pressure and amount of fluid in chamber 18 is prevented from being further reduced. This pressure and fluid trapped in chamber 18 ahead of piston 20 holds the piston 20 and the pressure plate 38 in a newly adjusted position.

If the fluid in chamber 18 should expand for any reason, for example due to a temperature rise caused by a severe application of the brake, valve 76 will crack open against the load of spring 78 allowing the excess pressure to escape thereby maintaining a substantially constant pressure in chamber 18 at all times. Further, if the fluid in chamber 18 should cool and contract allowing the piston 20 to retract into its chamber and thereby destroy the clearance formerly adjusted, the very next application of the brakes will effect an adjusting cycle which will automatically establish the desired clearance.

In the design of the illustrated embodiment of the present invention, the residual pressure in chamber 18 is held within the range of 25–35 pounds per square inch, this pressure serving the useful purpose of flaring the lips of sealing ring 22 outwardly into tighter sealing engagement with the walls of the piston chamber 18. Obviously, if the inherent resilience of the sealing ring is not sufficient to form a positive fluid seal, this residual pressure will overcome this deficiency, preventing leakage of fluid around piston 20.

The present invention has the meritorious characteristic of simplifying the problem of providing automatic adjusters for disk brakes. With the mechanical type of automatic adjusters it is necessary to utilize a plurality of these in circumferentially spaced relation whereas with the present invention, only one such adjusting device is needed, it being interposed ahead of the input leading to the hydraulic actuator, whether such actuator be of a singular or plural number.

Although only one embodiment of the invention has been illustrated and described, various changes in the form and relative arrangement of the parts may be made to suit requirements.

I claim:

1. In combination with an aircraft wheel, a disk brake comprising a plurality of axially movable friction disks rotatable with the wheel, a plurality of axially movable nonrotatable friction disks interleaved with said rotatable friction disks, a nonrotatable axially movable pressure plate adapted to close said disks into frictional engagement, a hydraulic actuator supporting member having an annular piston chamber disposed alongside said pressure plate, an annular piston reciprocably received in said chamber adapted to act against said pressure plate to cause frictional engagement of said friction disks, said supporting member being provided with an axially extending opening therethrough having three different diameter portions in progressive stepped relation, the smallest diameter portion opening adjacent said pressure plate, said different diameter portions providing a pair of radially extending shoulders, the largest diameter shoulder serving as a valve seat, said piston chamber communicating with the intermediate diameter portion of said opening, a pin slidably received in the smallest diameter portion of said opening and secured to said pressure plate and extending through said intermediate diameter portion and into the largest diameter portion of said opening, a cylindrical valve frictionally surrounding said pin for longitudinal movement within said intermediate portion, a conduit fitting having an axial stepped diameter bore fixedly received in said largest diameter portion, the large diameter bore of said fitting being received in said largest diameter portion, a sleeve having an end flange reciprocably received in said largest diameter portion and surrounding the respective end section of said pin, said flange serving as a valve and normally seating on said valve seat, and a compression spring surrounding said sleeve and biasing it toward said valve seat, the port defined by the inner opening of said flange being selectively opened and closed by said first valve, said first valve being arranged to engage said smaller diameter shoulder whereby said pin may be moved longitudinally in one direction with respect to said first valve.

2. A disk brake assembly comprising a plurality of interleaved rotatable and nonrotatable friction disks, a pressure plate for effecting frictional engagement of said disks, a hydraulic actuator cooperably associated with said pressure plate, a valve member controlling the port leading to said actuator, said valve member displaceable by fluid pressure transmitted to said actuator to open said port, and a valve carrying member operatively movable by said pressure plate for displacement of said valve member to close said port upon retractile movement of said pressure plate to trap fluid pressure in said actuator, said valve member being arranged for frictional sliding movement on said valve carrying member.

3. A disk brake assembly comprising a plurality of interleaved rotatable and nonrotatable friction disks, a pressure plate for effecting frictional engagement of said disks, a hydraulic actuator cooperably associated with said pressure plate, a valve member controlling the port leading to said actuator, said valve member being displaceable by fluid pressure transmitted to said actuator to open said port, a valve carrying rod adapted to be moved by said pressure plate and slidably supporting said valve to close said port upon retractile movement of said pressure plate thereby trapping fluid pressure in said actuator, a valve stop engageable by said valve member as said rod carries said valve during brake actuating movement of said pressure plate, and a pressure relief valve member operably associated with an outlet communicating with said actuator to relieve excessive pressures in said actuator caused by thermal expansion of the fluid therein.

4. A disk brake assembly comprising a plurality of interleaved rotatable and nonrotatable friction disks, a pressure plate for effecting frictional engagement of said disks, a hydraulic actuator cooperably associated with said pressure plate, a valve rod operably secured to said pressure plate passing through the inlet port for said actuator, an annular valve member slidably received on said rod for longitudinal movement into and out of closing engagement with said port, said valve member being displaceable by fluid pressure transmitted to said actuator and by retractile movement of said pressure plate, and a pressure relief valve member operably associated with an outlet communicating with said actuator to relieve excessive pressures in said actuator caused by thermal expansion of the fluid therein.

5. A disk brake assembly comprising a plurality of interleaved rotatable and nonrotatable friction disks, a pressure plate for effecting frictional engagement of said disks, a hydraulic actuator having an inlet port and being cooperably associated with said pressure plate, said port being disposed at one end of a cylindrical chamber offset from and communicating with said actuator, a valve rod secured to said pressure plate and reciprocably passing through said chamber and said port, an annular valve member for controlling said port and longitudinally movable in said chamber and slidably received on said rod, said valve member and said chamber having relative length dimensions which determine the amount of running clearance between friction disks, and a pressure relief valve member operably associated with an outlet communicating with said actuator to relieve excessive pressures in said actuator caused by thermal expansion of the fluid therein.

6. A disk brake assembly comprising a plurality of interleaved rotatable and nonrotatable friction disks, a pressure plate for effecting frictional engagement of said disks, a hydraulic actuator having an inlet port and being cooperably associated with said pressure plate, said port being disposed at one end of a cylindrical chamber offset from and communicating with said actuator, a valve rod operatively movable by said pressure plate and reciprocably passing through said chamber and said port, an annular valve member longitudinally displaceable in said chamber and slidably received on said rod, said valve member and said chamber having relative length dimensions which determine the amount of running clearance between friction disks, a second chamber coaxial with the first disposed on the opposite side of said port from said first chamber, a second annular valve member reciprocable in said second chamber and normally engaging the perimeter of said port, and means yieldably urging said second annular valve toward said port, said first valve member being movable to close the opening of said second annular valve member, said first valve member being unseated by fluid pressure transmitted to said actuator and seated upon reduction of said fluid pressure by the retractile movement of said pressure plate, and said second annular valve member being unseated by fluid pressure in said actuator which has exceeded a predetermined value during closure of said first valve member.

7. In combination with an aircraft wheel, a disk brake comprising a plurality of axially movable friction disks rotatable with the wheel, a plurality of axially movable nonrotatable friction disks interleaved with said rotatable friction disks, a nonrotatable axially movable pressure plate adapted to close said disks into frictional engagement, a hydraulic actuator supporting member having an annular piston chamber disposed alongside said pressure plate, an annular piston reciprocably received in said chamber adapted to act against said pressure plate to cause frictional engagement of said friction disks, said supporting member being provided with an axially extending opening therethrough having three different diameter portions in progressive stepped relation, the smallest diameter portion opening adjacent said pressure plate, said different diameter portions providing a pair of radially extending shoulders, the largest diameter serving as a valve seat, said piston chamber communicating with the intermediate diameter portion of said opening, a pin slidably received in the smallest diameter portion of said opening and secured to said pressure plate and extending through said intermediate diameter portion, a cylindrical valve frictionally surrounding said pin for longitudinal movement in said intermediate portion, a sleeve having an end flange reciprocably received in said largest diameter portion, said flange serving as a valve and normally seating on said valve seat, and means yieldably urging said sleeve toward said valve seat, the port defined by the inner opening of said flange being selectively opened and closed by said first valve, said first valve being arranged to engage said smaller diameter shoulder whereby said pin may be moved longitudinally with respect to said first valve.

8. A hydraulic automatic disk brake adjusting device comprising a support member having an opening extending therethrough provided with three different diameter portions in progressive stepped relation, said different diameter portions providing a pair of radially extending shoulders, the largest diameter shoulder serving as a valve seat, said intermediate portion having a fluid pressure outlet for communication with a hydraulic brake actuator, a pin slidably received in the smallest diameter portion of said opening adapted to be movable by a brake pressure plate and extending through said intermediate diameter portion, a first annular valve frictionally received on said pin for longitudinal movement in said intermediate portion, a second annular valve reciprocably received in said largest diameter portion and normally seating on said valve seat, and means yieldably urging said second valve toward seated position, the port defined by the inner opening of said second valve being selectively opened and closed by said first valve, said first valve engaging said smaller diameter shoulder after opening said port whereby said pin may be moved longitudinally with respect to said first valve.

9. A hydraulic automatic disk brake adjusting device comprising a support member having an opening extending therethrough provided with three different diameter portions in progressive stepped relation, said different diameter portions providing a pair of radially extending shoulders, the largest diameter shoulder serving as a valve seat, said intermediate portion having a fluid pressure outlet for communication with a hydraulic brake actuator, a pin slidably received in the smallest diameter portion of said opening adapted to be movable by a brake pressure plate and extending through said intermediate diameter portion, a first annular valve frictionally received on said pin for longitudinal movement in said intermediate portion, a second annular valve reciprocably received in said largest diameter portion and normally seating on said valve seat, and means yieldably urging said second valve toward seated position, the port defined by the inner opening of said second valve being selectively opened and closed by said first valve, said first valve engaging said smaller diameter shoulder after opening said port whereby said pin may be moved longitudinally with respect to said first valve, the space between said smaller diameter shoulder and the adjacent end of said first valve when said first valve is closed determining the amount of running clearance between the friction disks of the brake.

10. For use with a disk brake having a plurality of interleaved rotatable and nonrotatable friction disks, a pressure plate for effecting frictional engagement of said disks, and a hydraulic actuator having a port cooperably associated with said pressure plate; a hydraulic automatic brake adjusting device comprising a valve member controlling the port leading to said actuator, said valve member being movable to open said port by fluid pressure transmitted to said actuator, a valve carrying member operably secured to said pressure plate for displacement of said valve member to close said port upon retractile movement of said pressure plate to trap fluid pressure in said actuator, and a pressure relief valve member operably associated with an outlet communicating with said actuator to relieve excessive pressures in said actuator caused by thermal expansion of the fluid therein.

11. For use with a disk brake having a plurality of interleaved rotatable and nonrotatable friction disks, a pressure plate for effecting frictional engagement of said disks, and a hydraulic actuator having a port cooperably associated with said pressure plate; a hydraulic automatic brake adjusting device comprising a hydraulic actuator having an inlet port and being cooperably associated with said pressure plate, said port being disposed at one end of a cylindrical chamber laterally offset from and communicating with said actuator, a valve rod secured to said pressure plate and reciprocably passing through said chamber and said port, an annular valve member for controlling said port and longitudinally movable in said chamber and slidably received on said rod, said valve member and said chamber having relative length dimensions which determine the amount of running clearance between friction disks, and a pressure relief valve member operably associated with an outlet communicating with said actuator to relieve excessive pressures in said actuator caused by thermal expansion of the fluid therein.

12. For use with a disk brake having a plurality of interleaved rotatable and nonrotatable friction disks, a pressure plate for effecting frictional engagement of said disks, and a hydraulic actuator having a port cooperably associated with said pressure plate; a hydraulic automatic brake adjusting device comprising a hydraulic actuator having an inlet port and being cooperably associated with said pressure plate, said port being disposed at one end of a cylindrical chamber laterally offset from and communicating with said actuator, a valve rod secured to said pressure plate and reciprocably passing through said chamber and said port, an annular valve member longitudinally movable in said chamber and slidably received on said rod, said valve member and said chamber having relative length dimensions which determine the amount of running clearance between friction disks, a second chamber coaxial with the first disposed on the opposite side of said port from said first chamber, a second annular valve member reciprocable in said second chamber and normally engaging the peripheral edge of said port, and means yieldably urging said second annular valve toward said port, said first valve member being movable to close the opening of said second valve member, said first valve member being unseated by fluid pressure transmitted to said actuator and seated upon relief of said fluid pressure by the retractile movement of said pressure plate, and said second valve member being unseated by fluid pressure in said actuator which has exceeded a predetermined value while said first valve member is closed.

13. A hydraulic automatic disk brake adjusting device comprising a chamber having a movable wall therein, said chamber being provided with a port, a valve member controlling the port and arranged to be displaced by fluid inlet pressure transmitted through said port for actuation of said movable wall, a valve carrying member operatively constructed and arranged to be moved by said wall, said valve member being floatingly arranged on said valve carrying member, said valve carrying member moving said valve member to close said port upon movement of said wall in a predetermined direction to trap fluid pressure in said chamber, and a pressure relief means associated with said port to relieve excessive pressures in said chamber caused by thermal expansion of the fluid therein.

14. A hydraulically operated automatic brake adjusting device comprising a chamber having a movable wall therein, said chamber being provided with a port, a valve member controlling the said port and arranged to be displaceable therefrom by fluid inlet pressure transmitted through said port for actuation of said wall, and a valve carrying member constructed and arranged to be moved by said movable wall, said valve member being floatingly arranged on said valve carrying member, said valve carrying member moving said valve member to close said port upon movement of said wall in a predetermined direction to trap fluid pressure in said chamber.

PAUL A. DRISCOLL.

References Cited in the file of this patent

UNITED STATES PATENTS

| Number | Name | Date |
|---|---|---|
| 612,324 | Frazier | Oct. 11, 1898 |
| 2,423,882 | Frank | July 15, 1947 |